United States Patent [19]

Roymberg

[11] Patent Number: 4,841,716
[45] Date of Patent: Jun. 27, 1989

[54] STRETCHING MEANS FOR BRAKING A WEB OF PLASTIC SHEET WHICH IS PULLED OFF A REEL

[75] Inventor: Erling Roymberg, Naerbo, Norway

[73] Assignee: Underhaug A/S, Naerbo, Norway

[21] Appl. No.: 193,470

[22] Filed: May 13, 1988

[30] Foreign Application Priority Data

May 13, 1987 [NO] Norway ................................. 871987

[51] Int. Cl.$^4$ ............................................. B65B 11/04
[52] U.S. Cl. ........................................ 53/556; 53/587; 53/588; 53/389
[58] Field of Search ................. 53/389, 390, 556, 587, 53/588; 242/75.4

[56] References Cited

U.S. PATENT DOCUMENTS 933,439  9/1909  Harrington ......................... 242/75.4
4,281,500  8/1981  Mueller ................................. 53/587

FOREIGN PATENT DOCUMENTS 2020690 11/1971  Fed. Rep. of Germany ..... 242/75.4
2563507 10/1985  France ................................. 53/556

Primary Examiner—John Sipos
Attorney, Agent, or Firm—Pollock, Vande Sande & Priddy

[57] ABSTRACT

The invention relates to a stretching means for braking a web of plastic sheet which is pulled off a reel. The stretching means comprises an arm (4) which is mounted to be slewable about an axis (5) extending in parallel with the axis (3) of said plastic sheet reel, a first roller (6) which is pivotally mounted on arm (4) and is intended to be made to rest against reel (2). Furthermore, the stretching means comprises a second roller (7) which is pivotally mounted on arm (4) to receive a loop of plastic sheet web (12) which is pulled off said reel (2) to cause said second roller (7) to be pulled towards said reel (2), and a drive connection (8) between said two rollers (6,7) causing the plastic sheet web to be stretched in zone (13) between the plastic sheet reel and the looped roller (7) when said web is pulled off the reel.

15 Claims, 2 Drawing Sheets

STRETCHING MEANS FOR BRAKING A WEB OF PLASTIC SHEET WHICH IS PULLED OFF A REEL

The invention relates to a stretching means for braking a web of plastic sheet which is pulled off a plastic sheet reel.

The invention was developed in connection with wrapping straw feed bales in a plastic sheet to preserve the feed. The bale is placed on a carrier which is rotatable about a vertical axis and is rotated. A plastic sheet from a reel on a carreier is attached to the straw feed bale and is pulled from the reel and wound about the bale whilst said bale is rotating. During rotation about the vertical axis said bale is also made to rotate about a horizontal axis. In this manner the straw feed bale is gradually provided with wound plastic sheet which is overlapped. Obviously, it will also be possible to let the object, in the present case the straw feed bale, remain stationary, whilst the carrier with the rolled plastic sheet is made to move around the bale. As an example of the field of application mentioned above we refer to GB No. 2,159,489A. The invention is, however, not restricted to said field of application. Examples of other areas of application are found in U.S. Pat. No. 4,281,500 and GB No. 2,056,401A. These examples are, however, not exhaustive.

A problem arising when it is desired to achieve an approximately constant pulling force on the portion leaving a reel or roll of a means that is wound in layers on a carrier, is that the pulling force, mostly adjusted by a braking torque on the roll carrier, will increase with a decreasing reel diameter, and furthermore, that friction is variable. It is known to solve the first mentioned problem by, e.g. guiding the plastic sheet via one or two rollers which are connected to a braking means and bring about the necessary force. It is, furthermore, known to bias the plastic sheet by guiding it about two rollers which rotate with different velocity. It is also possible to brake manually when demands on a constant pulling force or tension in the wound means are not to high or critical.

Plastic sheet also has the undesirable property that it shows considerable reduction of width when it leaves the plastic roll and until it contacts the body to be wrapped, dependent on the pulling force and, thus, on how much it is stretched in the longitudinal direction. (Additionally, longitudinal waves or folds further reducing the width are easily formed.)

To wrap up an object in a plastic sheet, especially in case of tight winding, e.g. a straw feed bale to be tightly wrapped in a plastic sheet with the object of preservation it is, however, essential to achieve a substantially constant pulling force or tension, and sufficient width of the plastic sheet arriving at the object.

It is, thus, an object of the invention to provide a suitably stable plastic sheet web as regards force and width. Another object is to be able to stretch and utilize the properties of the plastic in order to reduce plastic material consumption as much as possible.

The plastic sheet used may, e.g. be a sheet of polyamide, polypropylene, PVC, polybutene, polyethylene, or copolymers or mixtures of said materials. The resiliency inherent in such a stretched plastic sheet will keep the wrapped object under tension, and this tension or enveloping force will depend on the modus of elasticity of the plastic sheet after stretching, and on the yield stress of the sheet wrapping.

A further object of the invention is to provide a stretching means having a simple structural design.

According to the invention a stretching means for a plastic sheet web pulled off a plastic roll is, thus, proposed, said stretching means according to the invention being characterized by comprising an arm which is mounted to be slewable about an axis that extends in parallel with the plastic roll axis, a first roller which is pivotally mounted in said arm and intended for contact with the plastic reel, a second roller which is pivotally mounted in said arm and intended to be looped by the web of plastic sheet pulled off the plastic reel causing said second roller to be pulled towards the plastic reel when sheet is pulled off, and a drive connection between said two rollers.

When the web of plastic sheet is looped around said second roller and is pulled of the reel said looped second roller will be pulled towards the plastic reel causing the arm to be slewed towards the plastic reel. Consequently, said first roller is urged into a stronger drive contact with the plastic reel which is caused to rotate in a dependent manner. This forced rotational movement has a braking effect on the plastic reel because of the gear ratio between the rollers.

The web of plastic sheet will pass through a stretching zone immediately from the reel and to said looped second roller to be pre-stretched there. Reduction of the width of the plastic sheet is, thus, very limited since this stretching zone is relatively short and the stretching effect will be constant, and dependent on the gear-ratio between said two rollers.

The power consumed in the stretching zone between the plastic reel and the looped second roller is substantially sufficient for maintaining a steady and stable tension or force in the leading plastic sheet web wound onto the object to be wrapped.

Below, the invention will be disclosed in more detail with reference to the drawing, where FIG. 1 shows a plan view of a stretching means according to the invention;

Figure 1:
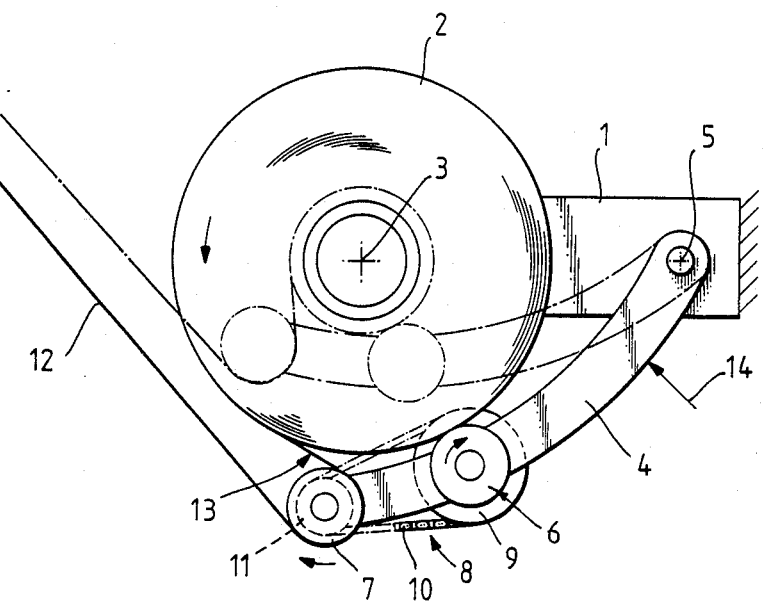

The new stretching means comprises a carrier 1 on which a plastic reel 2 is mounted to be pivotable about a vertical axis 3 in a manner not shown in detail. On carrier 1 an arm 4 is also slewably mounted. As shown, arm 4 is slewable about an axis 5 which is vertical and parallel with axis 3. On arm 4 a first roller 6 is pivotally mounted. Closer to the outside end of arm 4 a second roller 7 is pivotally mounted. Rollers 6 and 7 are mutually connected by the aid of a chain drive 8 comprising a sprocket 9 firmly connected with first roller 6, a chain 10, and a second sprocket 11 which is firmly connected with second roller 7.

Plastic sheet web 12 to be pulled off plastic reel 2 is placed, as shown, partly about second roller 7, and is pulled from plastic reel 2 in the direction indicated by the arrow. The second roller 7 is, thus, pulled toward plastic reel 2. Consequently, first roller 6 will bear against plastic reel 2, as shown in FIG. 1. Second roller 7 will be driven in the direction of the arrow by the pulled off plastic sheet web 12. Plastic reel 2 will be braked, because the rotational movement applied to second roller 7 will be transmitted to first roller 6, via gear ratio 8. First roller 6 rotating more slowly will exert a braking effect on reel 2.

Between second roller 7 and plastic reel 2 a short stretching zone 13 will be formed, and here plastic sheet web 12 will be stretched in a rather constant manner, depending on the gear ratio.

Dashed lines indicate how arm 4 with rollers 6 and 7 gradually move, i.e. slew inwards towards axis 3 whith a reducing diameter of plastic reel 2.

At 14 in FIG. 1 a spring force acting on arm 4 is indicated.

The geometry of the system is selected to achieve a substantially equal length of stretching zone 13 when the diameter of the plastic reel decreases. This can readily be achieved for each machine size in question by testing.

Figure 3:
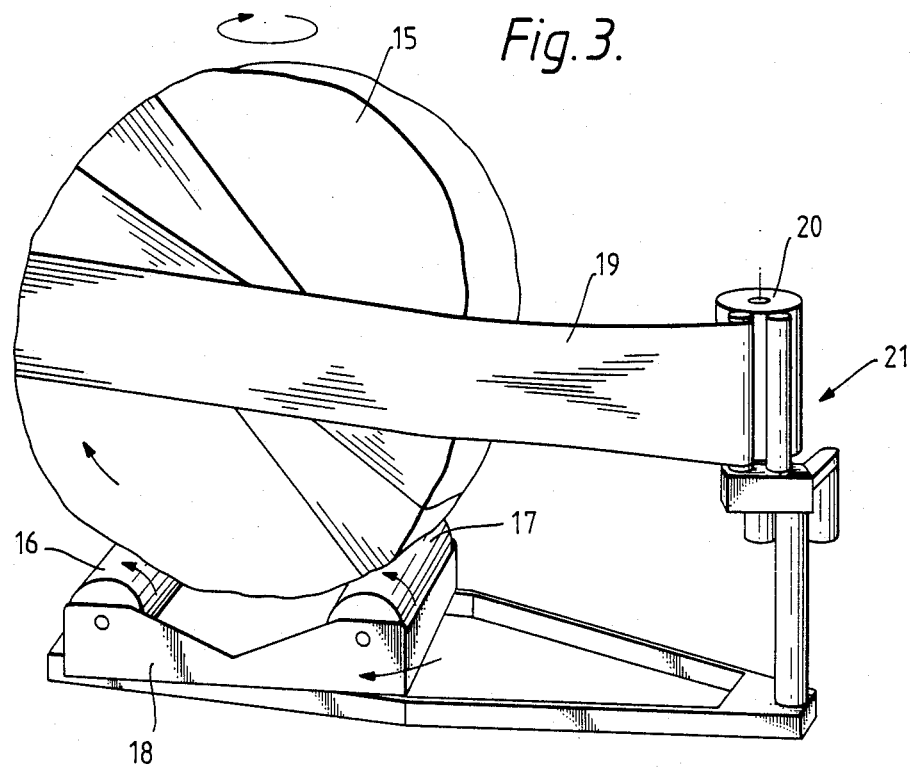
FIG. 3 is a view in perspective of a wrapping device utilizing the invention.
Figure 4:
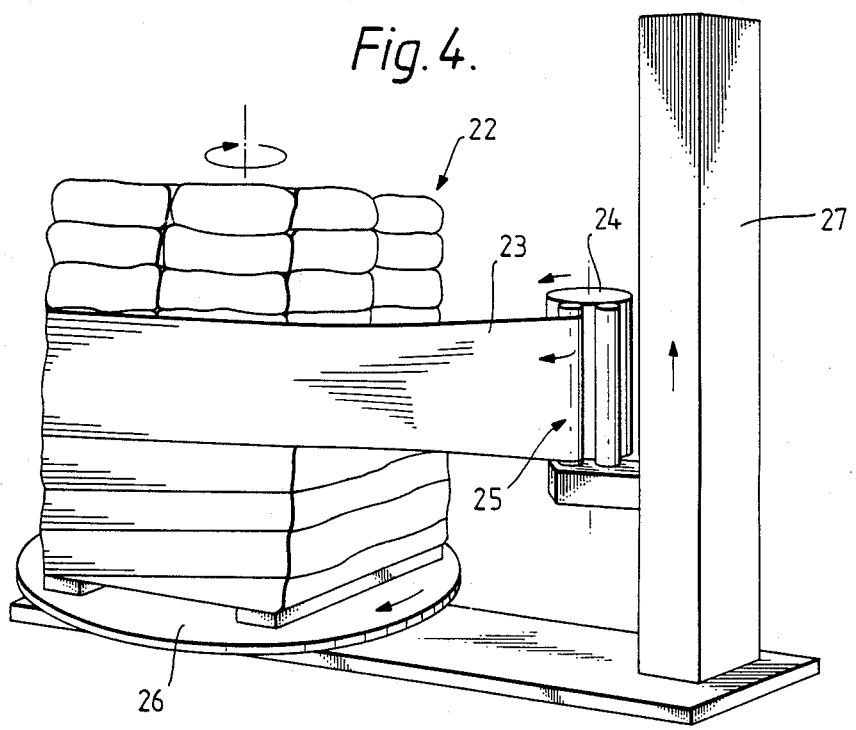
FIG. 4 is a view i perspective of another example of a device in which the invention is utilized.

FIGS. 3 and 4 show examples of wrapping/winding machines in which the invention may be utilized.

Figure 2:
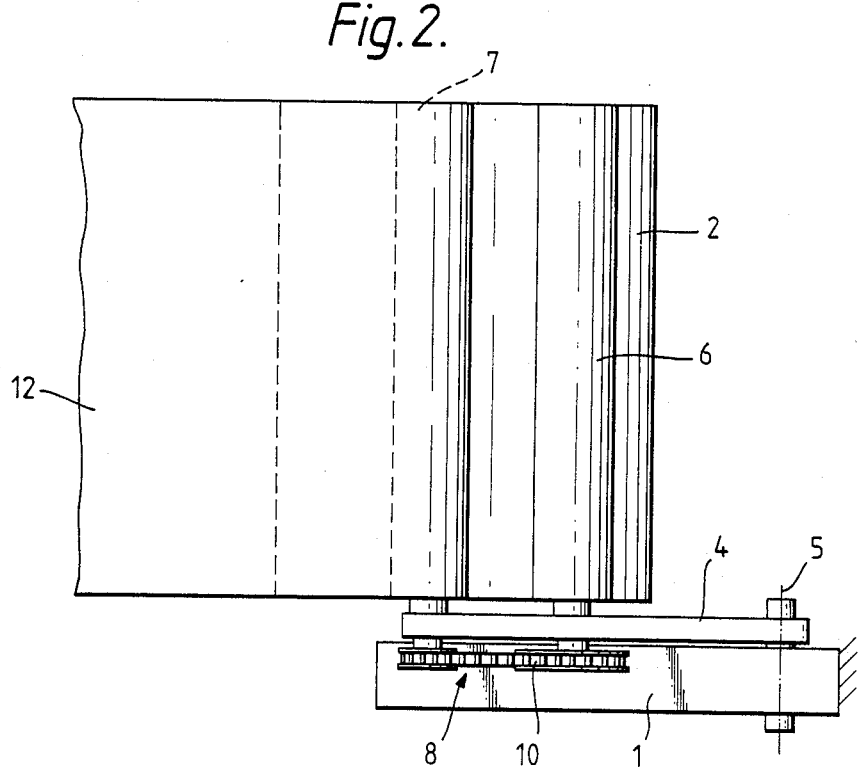
FIG. 2 shows a plan view, with both Figures being diagrammatical views.

In FIG. 3 a wrapping device is, thus, shown with a straw feed bale 15 which in the present case rests on driven rollers 16,17. Said rollers are provided in a frame 18 and are rotatable about a vertical axis. A web of plastic sheet 19 is unwound from a reel 20 by the aid of an arrangement as shown in FIGS. 1 and 2, and which in generally designated 21 in FIG. 3.

In FIG. 4 a device for winding a pallet load 22 with plastic 23. The plastic sheet is pulled off a roll 24. For this a device 25 is used which in principle, functions in the manner shown in FIGS. 1 and 2.

Pallet load 22 rests on a rotatable disk 26. Plastic roll 4, and stretching means 25 may be raised and lowered along carrier column 27.

I claim:

1. A stretching means for braking a web of plastic sheet being pulled off a plastic sheet reel, wherein it comprises an arm which is mounted to be pivotable about an axis extending in parallel with axis of the plastic sheet reel, a first roller rotatably mounted on said arm for resting against said plastic sheet reel, a second roller rotatably mounted on arm for receiving a loop of plastic sheet web pulled off said reel to cause said arm and said second roller to be pulled towards said reel when web is being pulled from the latter and press said first roller against said reel, and a drive connection between said rollers for driving the two rollers at different speeds and causing the plastic sheet web to be stretched in zone between said reel and said looped roller when it is pulled off said reel.

2. A stretching means as defined in claim 1, wherein the geometry of the system is designed so as to provide an approximately equal length of stretching zone as the diameter of said reel decreases.

3. A stretching means as defined in claim 1, wherein the drive connection is a chain drive.

4. A stretching means as defined in claim 1, wherein the drive connection comprises sprockets.

5. A stretching means as defined in claim 1, wherein said rollers are coated with a soft material, e.g. rubber, to provide the necessary friction between plastic sheet and rollers.

6. A stretching means as defined in claim 1 wherein a spring device acting on said arm in a direction towards the plastic sheet reel.

7. A stretching means as defined in claim 2, wherein the drive connection is a chain driven.

8. A stretching means as defined in claim 2, wherein the drive connection comprises sprockets.

9. A stretching means as defined in claim 2, wherein said rollers are coated with a soft material, e.g. rubber, to provide the necessary friction between plastic sheet and rollers.

10. A stretching means as defined in claim 3, wherein said rollers are coated with a soft material, e.g. rubber, to provide the necessary friction between plastic sheet and rollers.

11. A stretching means as defined in claim 4, wherein said rollers are coated with a soft material, e.g. rubber, to provide the necessary friction between plastic sheet and rollers.

12. A stretching means as defined in claim 2, wherein a spring device acting on arm in a direction towards the plastic sheet reel.

13. A stretching means as defined in claim 3, wherein a spring device acting on arm in a direction towards the plastic sheet reel.

14. A stretching means as defined in claim 4, wherein a spring device acting on arm in a direction towards the plastic sheet reel.

15. A stretching means as defined in claim 5, wherein a spring device acting on arm in a direction towards the plastic sheet reel.

* * * * *

UNITED STATES PATENT AND TRADEMARK OFFICE
CERTIFICATE OF CORRECTION

PATENT NO. : 4,841,716
DATED : June 27, 1989
INVENTOR(S) : Erling Royneberg

It is certified that error appears in the above-identified patent and that said Letters Patent is hereby corrected as shown below:

On the title page, under item [19], change
"Roymberg" to --Royneberg--;
change "[75] Inventor: "Erling Roymberg" to
--[75] Inventor: Erling Royneberg--.

Signed and Sealed this

Third Day of November, 1992

Attest:

DOUGLAS B. COMER

*Attesting Officer*          *Acting Commissioner of Patents and Trademarks*